UNITED STATES PATENT OFFICE.

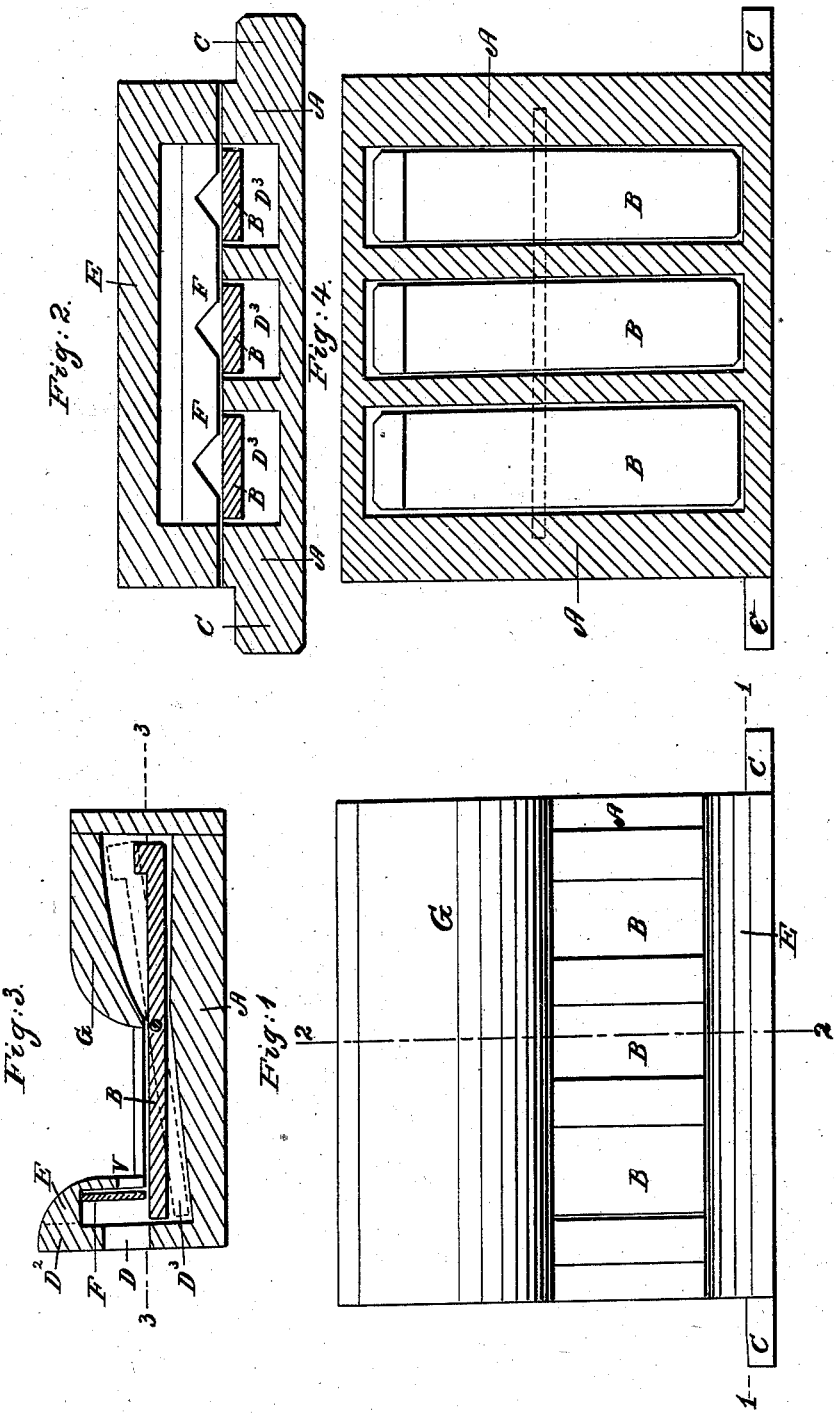

THOS. D. HOWELL, OF ZANESVILLE, OHIO.

BEE-PROTECTOR.

Specification of Letters Patent No. 3,379, dated December 15, 1843.

*To all whom it may concern:*

Be it known that I, THOMAS D. HOWELL, of Zanesville, Muskingum county, State of Ohio, have invented a new and useful Apparatus to be Attached to Beehives for Excluding Moths or Millers Therefrom, called "Howell's Bee-Protector," which is described as follows, reference being had to the annexed drawings of the same, making part of this specification.

Figure 1 is a top view of the apparatus. Fig. 2 is a vertical section at the line 1, 1 of Fig. 1. Fig. 3 is a section at the line 2, 2 of Fig. 1. Fig. 4 is a section at the line 3, 3 of Fig. 3.

This apparatus consists of a base A fastened to the bee hive at the usual entrance thereto, containing a number of vibrating trap-boards upon which the bees light which are depressed by the weight of the bees to admit them to enter or leave the hive and then to resume their former position and close the entrances to the hive and thus exclude the moth—the latter not being heavy enough to depress the trap-boards—one bee being as heavy as four moths.

The base is made in the following manner. It consists of a board A termed the base board which is grooved in parallel grooves or channels of the requisite breadth and depth for the trap boards B to vibrate freely therein, the said grooves extending from near the back edge through to near the front edge of the board. In these grooves are placed a number of vibrating trap boards B vibrating on axles at or near their centers inserted into the solid parts of the base board which come between the trap boards and passing through or into the latter. The base board is provided with suitable ears or projecting ends C perforated for the insertion of suitable fastenings by which it is secured to the hive. When it is put into its proper place its upper surface and the upper surfaces of the trap boards should be nearly on a level with the usual entrance to the hive.

A hollow chamber or case D is formed over the ends of the trap boards next to the entrances in the following manner. A rectangular board $D^2$ is prepared of suitable length, breadth and thickness. From its lower edge is taken a piece about the length and breadth of the intended chamber. This board thus shaped is then placed edgewise upon the front of the base board and secured thereto with its front side or face on a line with the edge of the base that is secured to the hive, the space being over the entrances. On the back of this board is placed and secured a hollow cap or cover E notched on its lower edges as at V in the cavity of which is placed a rectangular or other shaped plate of glass F or piece of wire gauze or other suitable article to transmit light with its lower edge even with the lower edge of said cap and upper surface of the base board so as to cover the aforesaid notches or spaces through which the light is to be admitted to allure the bees to the tilting ends of the traps where they are to enter and exit. The traps in their usual position of rest bear against the lower edge of the said glass or gauze and prevents the entrance of small insects. The space or chamber thus formed over the inner ends of the traps and glass in front of the hive is sufficient for the bees in making their exit, to have room to light upon the ends of the traps working between the glass and hive.

$D^3$ are spaces under the inner ends of the trap boards.

The outer half of the length of the traps is closely covered with a hollow cap or cover G to prevent all access of any insect and to prevent the bees from lighting upon the longer ends of the trap board, the space in said cap or cover being sufficiently large to allow the outer ends of the traps to play freely therein. These ends are nicely weighted so as to give them a preponderance over the additional weight of a moth or miller when on the opposite or short end next the entrance and of less weight than the bee which preponderating weight will be overcome by the bee lighting on the last mentioned end as before stated being heavier than said additional weight of the longer end of the trap board.

The operation of this bee protector may be thus described. The bee being allured by the light emitted through the glass or gauze at the entrance lights upon the trap, advances to the light, the trap tilts and thus opens a space between it and the glass to admit the bee to enter. The bee having passed under the glass proceeds to the usual entrance of the hive. As soon as she leaves the inner end of the trap it springs up to its former position by reason of the removal of the weight of the bee. The bee in making her exit lights upon the inner end of the trap, (which is between the glass and hive,) depresses it as before, passes under the glass and leaves the trap, which again rises and closes the aperture. When the miller arrives at the entrance he finds his progress stopped by a glass or a fine wire gauze guard. His weight being insufficient to overcome the weighted end of the trap the trap remains closed and he is disappointed in his effort to enter the hive.

The number and size of the traps and cases may be varied to suit circumstances.

What I claim as my invention and which I desire to secure by Letters Patent is—

The combination of the vibrating traps B with the lighted case D, arranged and operated in the manner and for the purpose described or in any other mode substantially the same; and I claim said combination whether applied to the common bee hives or to any description of bee hive for the purpose of excluding the moth or other insects therefrom, or for any other purpose.

THOMAS D. HOWELL.

Witnesses:
   N. Chapman,
   M. E. Chapman.